United States Patent [19]

Ratcliff et al.

[11] Patent Number: 5,740,438
[45] Date of Patent: Apr. 14, 1998

[54] METHODS AND SYSTEM FOR NETWORK COMMUNICATIONS OF MULTIPLE PARTITIONS

[75] Inventors: Bruce Henry Ratcliff; Anthony Robert Sager, both of Red Hook; Stephen Roger Valley, Valatie, all of N.Y.

[73] Assignee: International Business Machines Corporation, Armonk, N.Y.

[21] Appl. No.: 414,851

[22] Filed: Mar. 31, 1995

[51] Int. Cl.[6] ............................................. G06F 13/14
[52] U.S. Cl. ............................................. 395/680; 370/463
[58] Field of Search ............................. 395/650, 416, 395/417, 418, 680; 370/463, 437

[56] References Cited

U.S. PATENT DOCUMENTS

| | | | |
|---|---|---|---|
| 4,768,150 | 8/1988 | Chang et al. | 395/682 |
| 4,780,821 | 10/1988 | Crossley | 364/200 |
| 4,835,674 | 5/1989 | Collins et al. | 364/200 |
| 4,949,248 | 8/1990 | Caro | 364/200 |
| 4,985,892 | 1/1991 | Camarata | 370/123 |
| 5,265,239 | 11/1993 | Ardolino | 395/500 |
| 5,299,193 | 3/1994 | Szczepanek | 370/463 |
| 5,313,592 | 5/1994 | Buondonno et al. | 395/284 |
| 5,315,711 | 5/1994 | Barone et al. | 395/275 |
| 5,365,606 | 11/1994 | Brocker et al. | 395/650 |
| 5,448,566 | 9/1995 | Richter et al. | 370/431 |
| 5,471,474 | 11/1995 | Grobicki et al. | 370/437 |
| 5,535,338 | 7/1996 | Krause et al. | 395/200.2 |
| 5,546,584 | 8/1996 | Lundin et al. | 395/683 |

OTHER PUBLICATIONS

Accetta et al., "Mach: A New Kernel Foundation for UNIX Development", Proceedings of the Summer 1986 USENIX Conference, Atlanta, GA, pp. 93–112, 1986.

Black et al., "Microkernel Operating System Architecture and Mach", Proceedings of the USENIX Workshop on Micro-Kernels and Other Kernel Architectures, Seattle Washington, pp. 11–30, Apr. 1992.

Bricker et al., "Architectural issues in microkernel-based operating systems: the CHORUS experience", Computer Communications, v. 14, No. 6, pp. 347–357, Aug. 1991.

Proceedings of the USENIX Workshop on Micro-Kernels & Other Kernel Architectures, Apr. 1992.

*Primary Examiner*—Tod R. Swann
*Assistant Examiner*—Christopher S. Chow
*Attorney, Agent, or Firm*—Lawrence D. Cutter; Heslin & Rothenberg, PC

[57] ABSTRACT

In a mainframe class data processing system having multiple partitions and a port to a network, a table is established. The table defines communications paths between the port to the network and at least two partitions of the multiple partitions. More specifically, each partition has at least one application executing therewithin and the communications paths are defined thereto. Data frames are passed between the network and the applications within the partitions through the port to the network and along the communications paths defined in the table such that network communications is effected.

22 Claims, 6 Drawing Sheets

INITIALIZATION SEQUENCE

OPERATIONS – OUTBOUND TRAFFIC

METHODS AND SYSTEM FOR NETWORK COMMUNICATIONS OF MULTIPLE PARTITIONS

TECHNICAL FIELD

The present invention relates in general to network communications of processing systems. More particularly, the present invention relates to methods and a system for effecting communications between a network and multiple partitions of a data processing system.

BACKGROUND OF THE INVENTION

Mainframe class data processing systems have hardware and software facilities that enable partitioning thereof. That is, such processing systems may be subdivided into multiple partitions whereby a user of a partition, or software executing in a partition, has the impression that the processing system is exclusively used by them. Each partition has the appearance of being a separate and distinct processing system and may even run its own multitasking and multiuser operating systems independent from each other partition. An IBM Enterprise Systems Architecture ("ESA")/390 mainframe computer is an example of one such partitionable mainframe class data processing system. Partitioning thereof is described in, for example, the publication entitled IBM ESA/390 Principles of Operation, IBM publication number SA22-7201-02, December 1994, and in the IBM Enterprise System/9000 Processor Resource/Systems Manager Planning Guide, IBM publication number GA22-7123-11, April 1994, which are both hereby incorporated herein by reference in their entirety.

Software executing in individual partitions within a mainframe class data processing system may require a network connection such as a Local Area Network ("LAN") connection or a Wide Area Network ("WAN") connection. This may be used to facilitate connectivity to users, or to application programs used in, for example, a client-server processing environment. Shown in FIG. 1 is the conventional configuration used to connect individual partitions, including the software running therein, to a LAN. The configuration includes a processing system 11 that has partitions 13, 15, 17, 19, 20 and 21.

Network connectivity for each partition of the system of FIG. 1 is conventionally achieved using separate network interfaces for each partition. For example, partition 13 is connected through channel connection 29 to an IBM 3172 Interconnect Controller 23 (with 8232 Channel Interface Attachment) that has, for example, a token ring LAN port 32 attached to LAN 37 thereby providing LAN connection 31. Network connectivity is accordingly directly provided between partition 13 and computers 43 and 45 on LAN 37 through the IBM 3172 23. However, according to conventional techniques, this configuration has no other direct logical or physical connections from any of the other partitions to LAN 37. To further note, each application within partition 23 must communicate with a different network port on IBM 3172 23. The IBM 3172 (having internal 8232 Channel Interface Attachment), is described in a publication entitled 8232 LAN Channel Station, Apr. 15, 1988, IBM publication number ZZ25-8577-0, that is incorporated herein by reference in its entirety.

The conventional software executing on IBM 3172s restricts direct logical connectivity to being between a single partition and its corresponding LAN. Thus, to facilitate direct connectivity from a computer 47 on a LAN 39 to both partitions 17 and 21, multiple IBM 3172s must be used. Partition 17 is coupled to LAN 39 via channel connection 29', IBM 3172 25 and LAN port 34 thereby establishing LAN connection 33. Similarly, partition 21 is coupled to LAN 39 via channel connection 29", IBM 3172 27, and LAN port 35 thereby establishing LAN connection 36.

The conventional host to network connectivity techniques have several limitations. Connectivity between a single network (i.e. LAN or WAN) and multiple partitions require the use of multiple interfaces therebetween such as, for example, multiple IBM 3172s. Further, each application executing in a single partition must use a different port on the IBM 3172 corresponding to the single partition. Of course, using multiple interfaces and ports introduces further problems including requirements for additional cabling, floor space, power and cooling. Systems management also becomes more complex as each of the multiple interfaces must be managed separately. Even further, costs associated with the required software licenses for each of the multiple interfaces may become excessive. The present invention is directed toward solutions for the above noted problems.

DISCLOSURE OF THE INVENTION

In a first aspect, the present invention includes, a method of network communications for use in a mainframe class data processing system having multiple partitions and a port to a network. The method includes establishing a table defining communications paths between the port to the network and at least two partitions of the multiple partitions. Data frames are passed between the network and the at least two partitions of the multiple partitions. Specifically, the data frames are passed through the port to the network and along the communications paths defined in the table such that network communications is effected.

As an enhancement, each partition of the at least two partitions may have at least one application executing therein. The establishing step may then comprise defining within the table each application of the at least one application executing with each partition of the at least two partitions to have a logical application address associated with it. The passing step then may comprise extracting a logical destination address from a received data frame, and if a logical application address corresponding to the logical destination address is in the table, then passing the received data frame to a destination application defined within the table and having its logical application address corresponding to the logical destination address.

In another aspect, the present invention includes a method of network communications for use in a mainframe class data processing system having multiple partitions, a port to a network, and a table. Each partition of the at least two partitions has at least one application executing therein. Further, the table contains an application definition associated with the port to the network for the at least one application executing within each partition. Each application definition comprises a logical address.

The method includes receiving an inbound data frame having a logical destination address from the network through the port to the network. The logical destination address is then extracted from the inbound data frame and a destination application is looked up in the table, the destination application having a corresponding logical address to the logical destination address. If the destination application is found in the table, then the inbound data frame is passed to the destination application such that network communication is effected between the network and the destination application.

As an enhancement, the mainframe class data processing system may have multiple ports to multiple networks. Each application definition may then include a port parameter such that the receiving step of the method comprises receiving the inbound data frame from a receiving port of the multiple ports. The looking up step may then comprise looking up the destination application in application definitions of the table wherein the port parameter corresponds to the receiving port.

As a further enhancement, the method may include transmitting an outbound data frame from a transmitting application of the at least one application executing within each partition. Transmitting the outbound data frame comprises determining an outbound port of the multiple ports of the system that corresponds to the transmitting application within the table. The outbound data frame is then sent out of the outbound port onto an attached network of the multiple networks.

As yet another enhancement, the mainframe class data processing system may have multiple tables that together comprise the application definitions. A first table of the multiple tables comprises a protocol portion of the application definitions and includes at least one protocol and associated pointer to a secondary table of the multiple tables. The secondary table corresponds to the at least one protocol. The extracting step may then comprise extracting a received protocol from the inbound data frame, looking up the received protocol in the first table to obtain the associated pointer to a second table and looking up the destination application in the secondary table.

In a further embodiment, the mainframe class data processing system may have at least one partition with multiple applications executing therein. The table then defines communications paths between the port to the network and at least two applications of the multiple applications. Data frames may then be passed between the network and the at least two applications along the communications paths defined in the table and through the port to the network.

Further enhancements to the above-described methods and a corresponding system for network communications are recited herein.

To summarize, the techniques of the present invention have many advantages and features associated with them. By facilitating network communications from multiple applications within multiple partitions through a common host to network interface, the resources required to perform such network communications have been reduced. Specifically, the hardware resources required have been reduced along with the associated software and license costs. Reduced hardware resources translate into a reduction in required channels, floor space, cabling, cooling, and power. In terms of software maintenance, a single configuration console corresponding to the single host to network interface may be used to manage all system network connections rather than multiple consoles for each separate, for example, IBM 3172, previously required. Further, migration to a system employing the techniques of the present invention may be performed without modifying current application programs. All these advantages and features translate into increased reliability, availability, and serviceability ("RAS") for the processing system.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

BEST MODE FOR CARRYING OUT THE INVENTION

Figure 1:
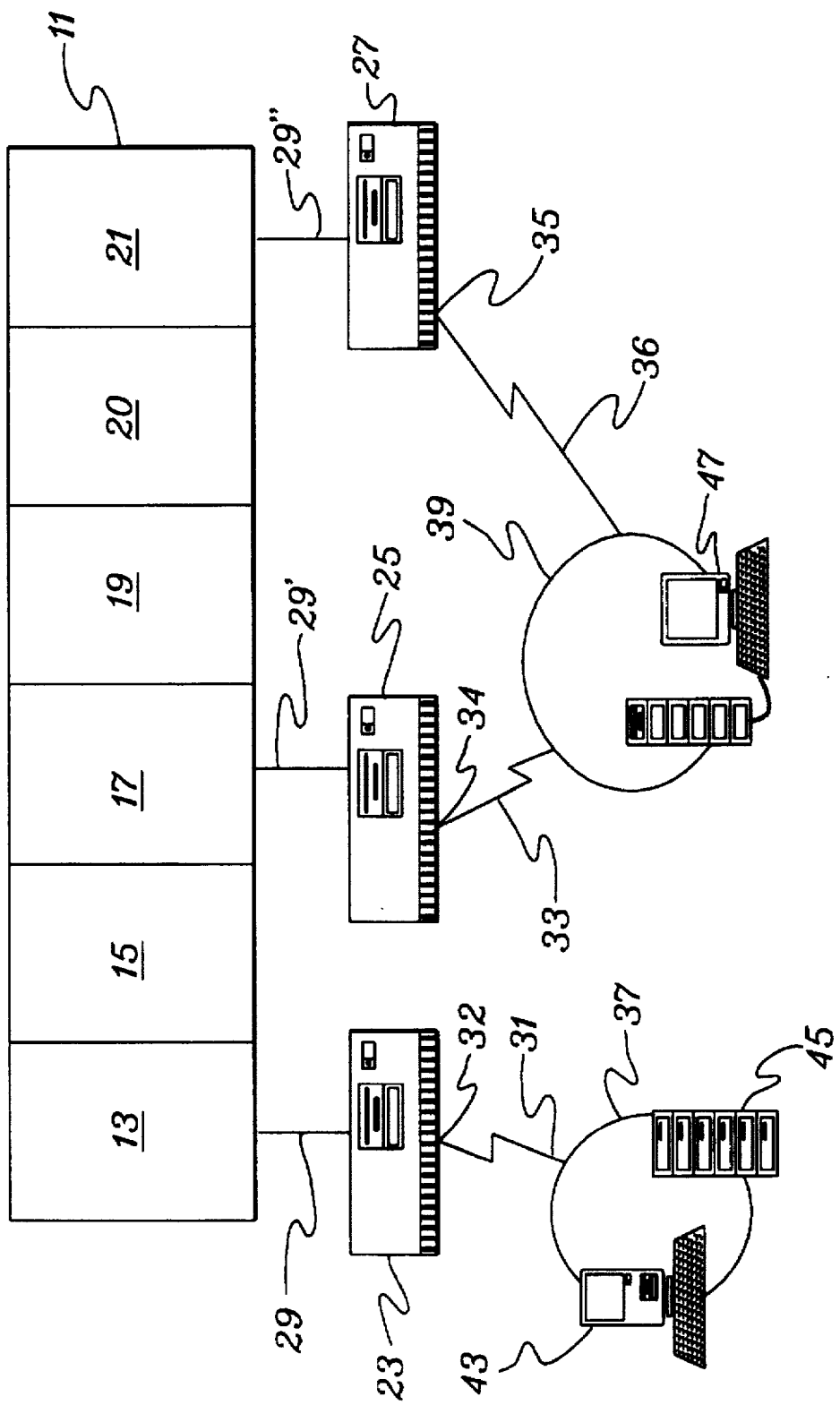
FIG. 1 is a system diagram of a conventional network connected partitionable mainframe class data processing system.
Figure 2:
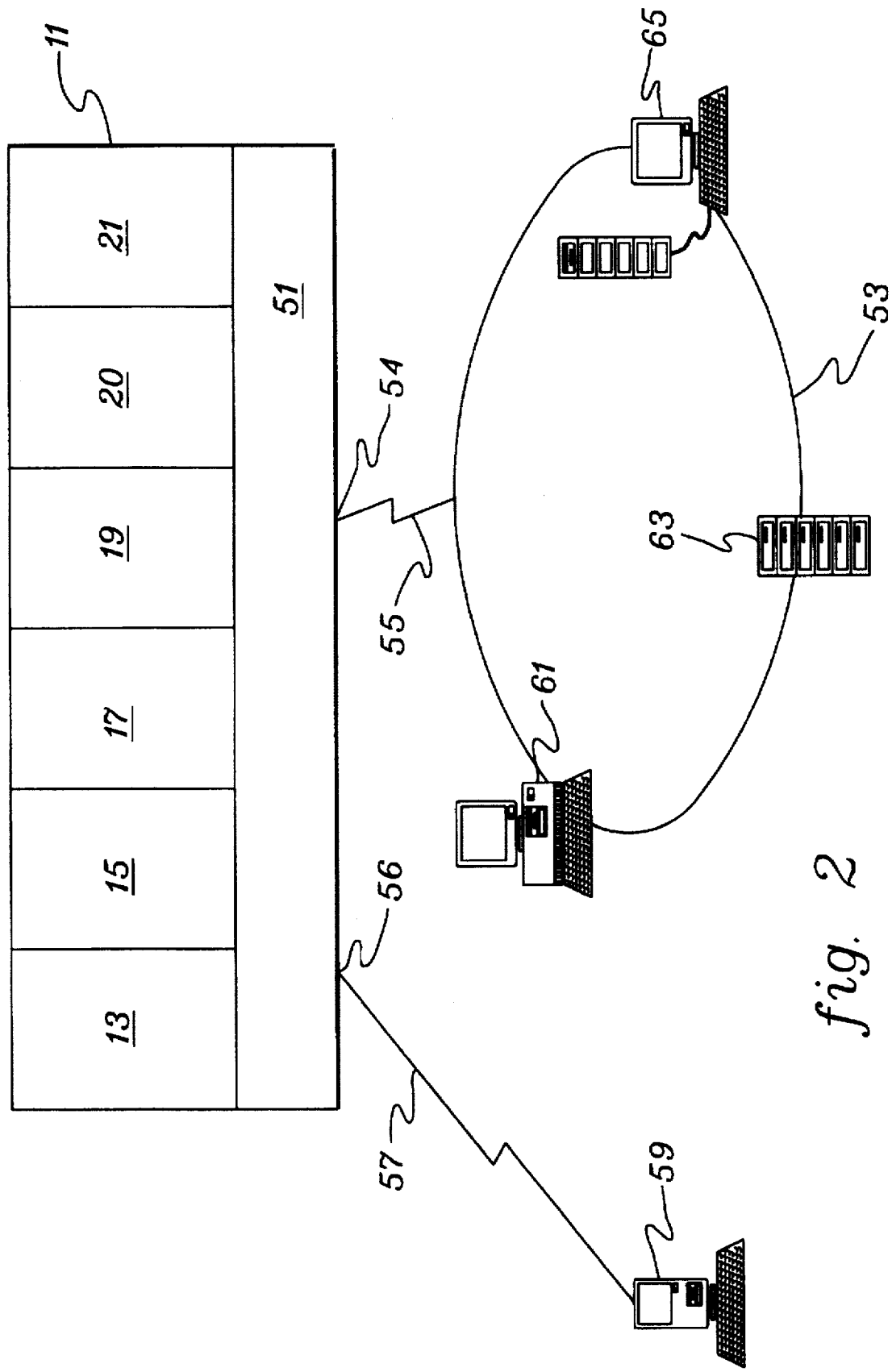
FIG. 2 is a system diagram of a network connected partitionable mainframe class data processing system pursuant to an embodiment of the present invention.

Shown in FIG. 2 is a partitionable mainframe class data processing system 11 (e.g., an IBM Enterprise System/9000) having an integral host to network interface ("HNI") 51 that facilitates a LAN connection 55 from multiple partitions 13, 15, 17, 19, 20 and 21 to LAN 53 through LAN port 54. Each application in each partition may directly communicate with computers 61, 63 and 65 on LAN 53 through the single host to network interface 51 and single LAN port 54. The LAN shown is a Token Ring LAN; however, the present invention is equally applicable to other types of LANs such as, for example, Ethernet and Fiber Distributed Data Interface ("FDDI") as will be apparent to one of ordinary skill in the art. Further, different applications within a single partition may communicate through a common network port. The host to network interface may support multiple network connections by way of multiple network ports. For example, a WAN connection 57 comprising, for example, a Peer to Peer Protocol ("PPP") connection is established to a computer 59 through WAN port 56. Any mix of LAN and WAN connections among multiple ports of host to network interface 51 is possible.

Figure 3:
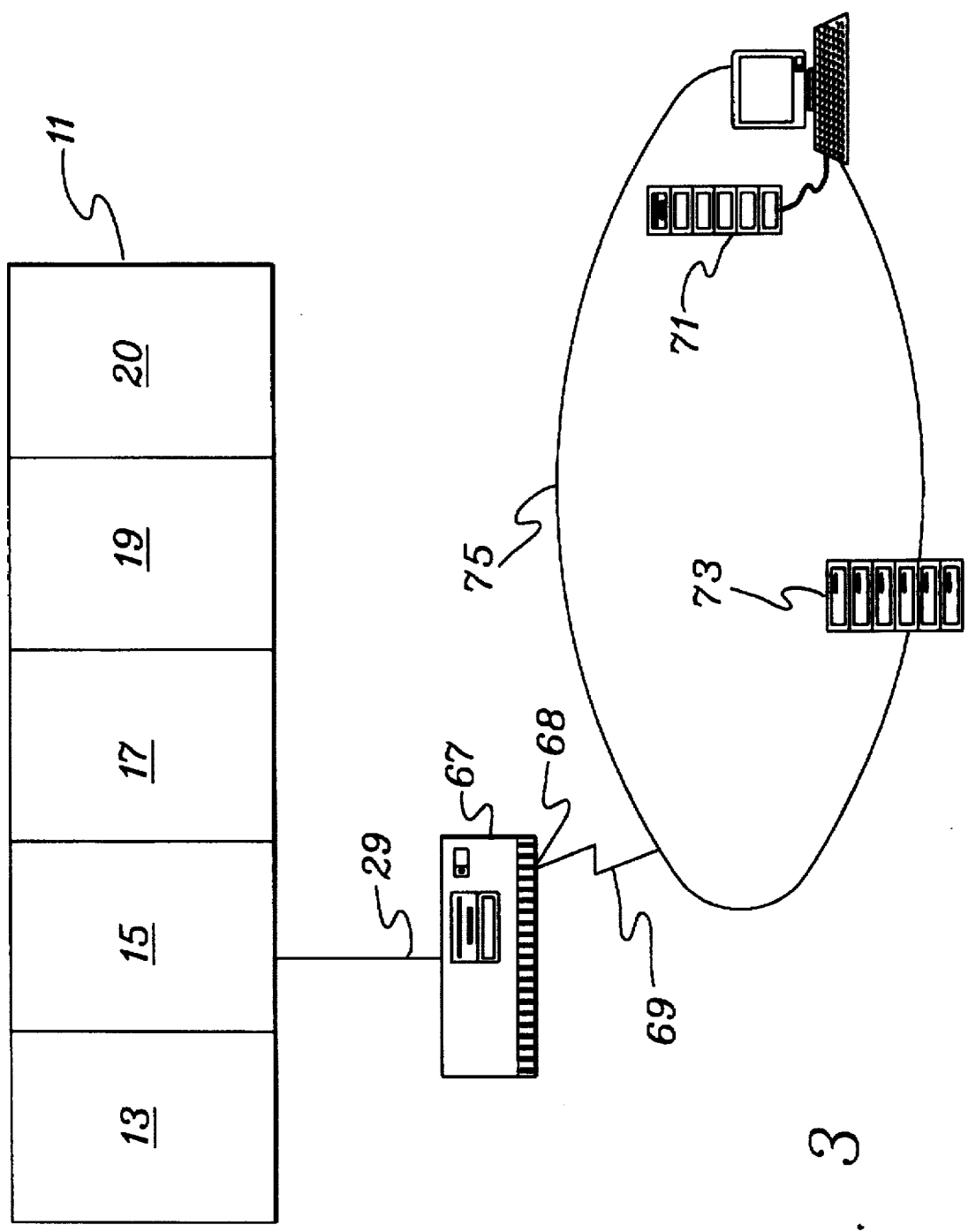
FIG. 3 is a system diagram of a network connected partitionable mainframe class data processing system in accordance with an alternate embodiment of the present invention.

Although the host to network interface 51 of FIG. 2 is part of the processor 11, other embodiments of the present invention are possible. As one example, an IBM 3172 67 (FIG. 3) may be loaded with software to enable its use as the HNI of the present invention; the techniques implemented by the software are discussed further hereinbelow. In this example, single HNI 67 provides direct network connectivity for each of partitions 13, 15, 17, 19 and 20 within mainframe class data processing system 11 to computers 71 and 73 on LAN 75. A channel connection 29 comprising, for example, an Enterprise System Connection ("ESCON") connects processing system 11 to HNI 67. LAN 75 connects to a network port 68 of HNI 67 thereby providing LAN connection 69.

Figure 4:
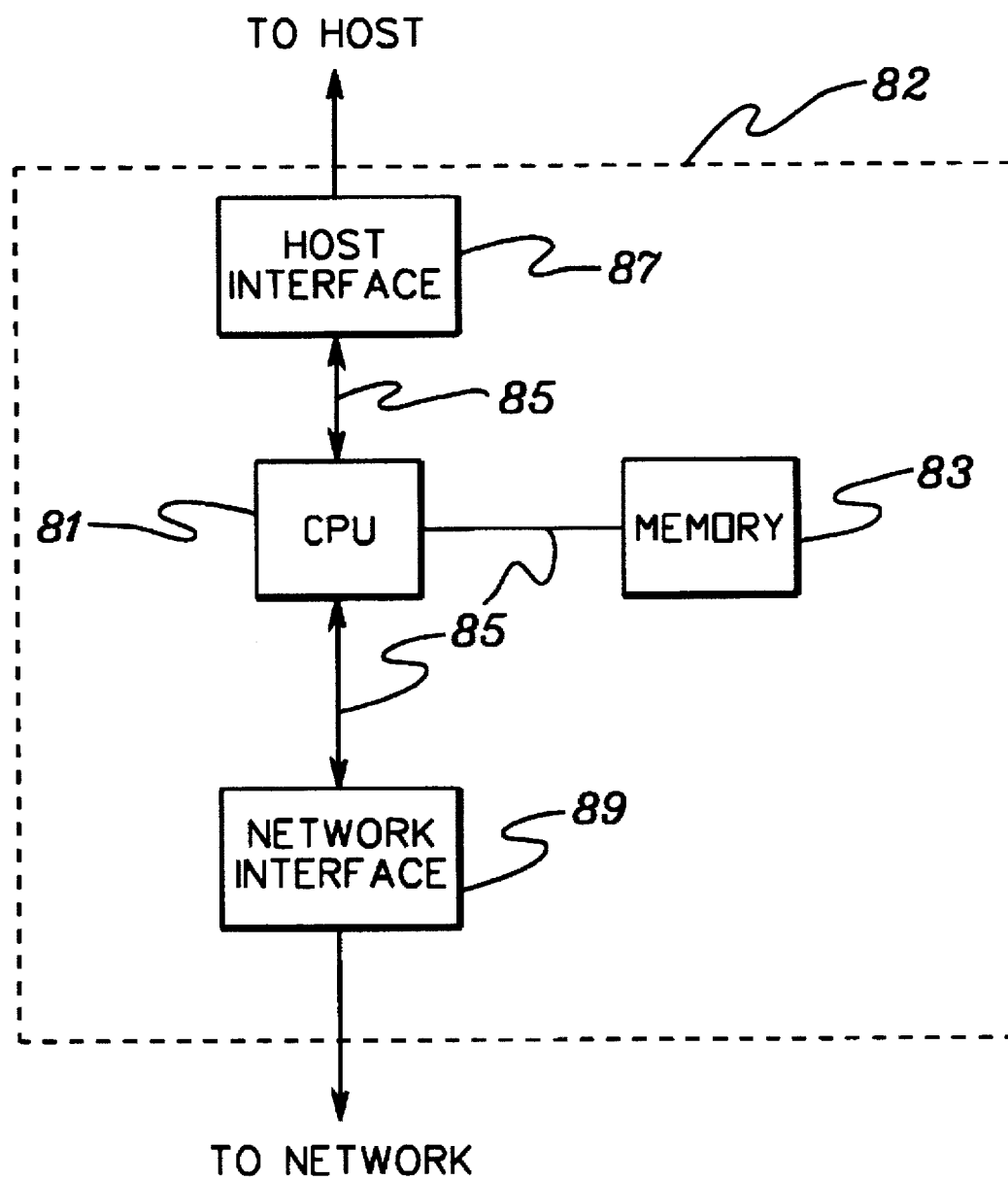
FIG. 4 is a block diagram of a host to network interface pursuant to an embodiment of the present invention.

Regardless of whether the host to network interface is internal to the processor (FIG. 2-51) or external to the processor (FIG. 3-67), the HNI 82 (FIG. 4) includes similar elements. A CPU 81 processes the communications traffic passing through the HNI 82. A memory 83 is connected to CPU 81 and facilitates storage of programs and data used for processing. CPU 81 is further connected to a host interface 87 that is connected to a host processor. Host interface 87 may comprise, for example, an ESCON channel interface if the HNI 82 is an IBM 3172, or it may comprise logic that directly connects to internal processor busses if the HNI 82 is disposed within the mainframe processor itself. Further included in HNI 82 is at least one network interface 89 that connects to one of the types of LANs or WANs as discussed hereinabove, while additional network interfaces may be added to HNI 82 as necessary. Each element shown within HNI 82 connects to CPU 81 via bidirectional buses 85. The design and construction of the HNI 82 hardware along with many possible variations thereof will be apparent to one of ordinary skill in the art.

The network communications techniques of the present invention are described hereinbelow with regard to the flow diagrams of FIGS. 5-7. The implementation of each of the individual steps of these techniques within an HNI will be apparent to one of ordinary skill in the art.

Conventionally, an application program within a partition initiating communications across a network will present various initialization commands to the processing system. These commands are detected by the appropriate IBM 3172 by means of an associated device address included within the commands that the IBM 3172 recognizes. As is well known, the device address identifies both the application sending the commands and the partition that the application is executing in. Specifically, the device address is available on the internal processor busses and on ESCON Multiple Image Facility ("EMIF") channels. The device address accompanies all network communications commands sent by an application including initialization commands. Further information regarding this aspect of IBM 3172 operations will be apparent to one of ordinary skill in the art and is described in the IBM 823 LAN Channel Station document incorporated by reference hereinabove.

According to the techniques of the present invention, the initialization sequence of each application remains the same as if it were communicating with a conventional IBM 3172. This sequence comprises, for example, a STARTUP/STARTLAN sequence for Transmission Control Protocol/Internet Protocol ("TCP/IP") communications and is described in, for example, the IBM 8232 LAN Channel Station document incorporated by reference hereinabove and TCP/IP Tutorial and Technical Overview, IBM document number GG24-3376-01, published Jun. 5, 1990 and hereby incorporated by reference herein in its entirety.

Figure 5:
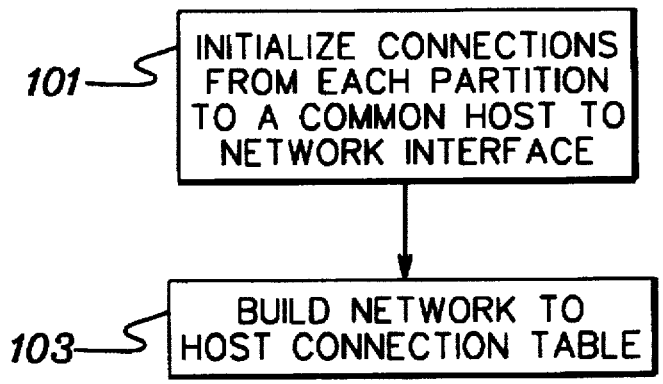
FIG. 5 is a flow diagram of an initialization method in conformance with one embodiment of the present invention.
Figure 6:
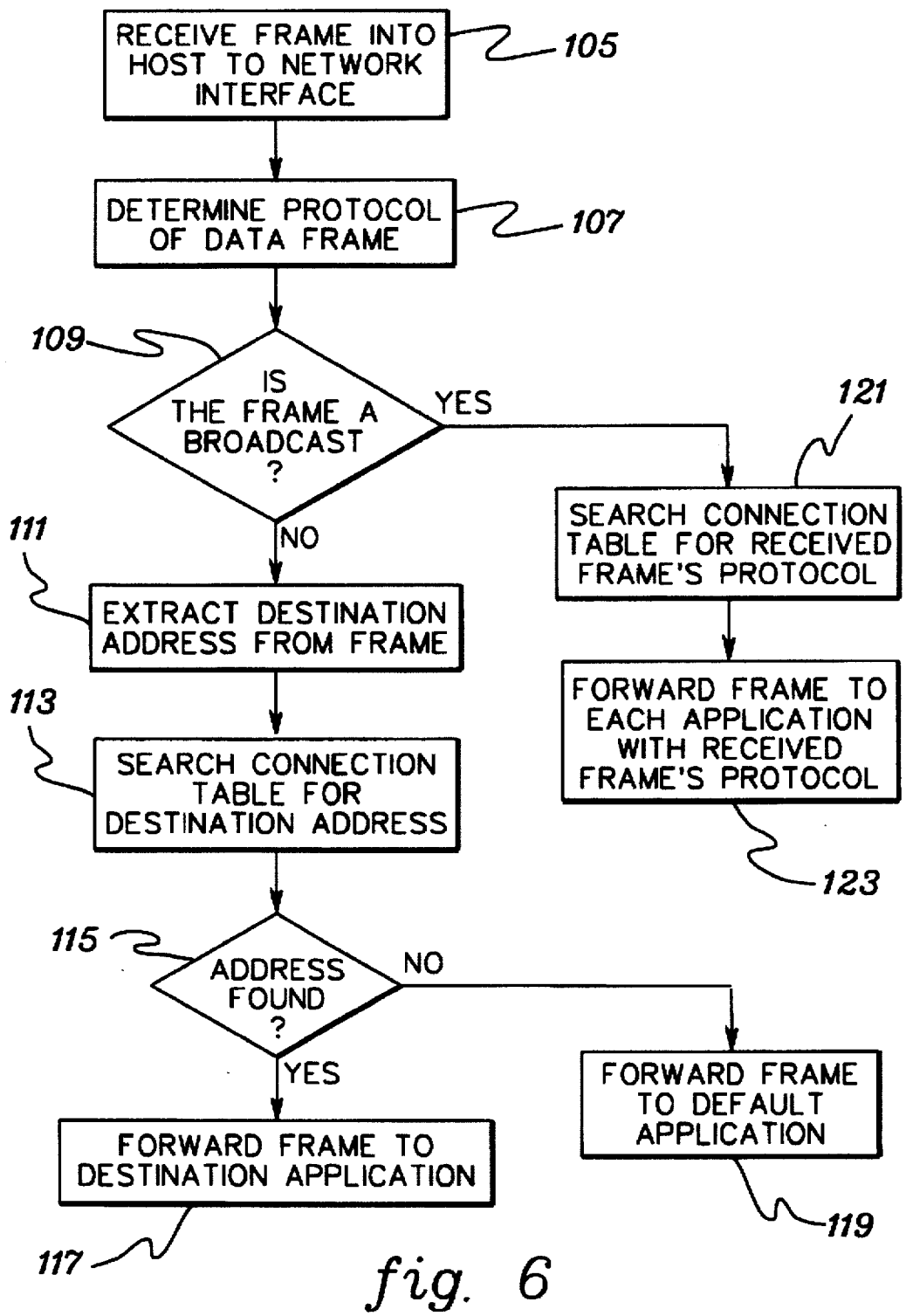
FIG. 6 is a flow diagram of an operational method for processing inbound network traffic pursuant to an embodiment of the present invention.

According to the techniques of the present invention, a common HNI is responsive to initialization sequences from multiple applications in multiple partitions (FIG. 5-101). When an initialization sequence is detected by the HNI, an entry is added for the initiating application to a network to host connection table, referred to herein as a "connection table" (103). An example of a connection table and description of the fields therein are set forth below:

| Device Address | Port | Protocol | Logical Address |
|---|---|---|---|
| 1-2 | 1 | TCP/IP | 1.2.3.4 |
| 1-3 | 1 | TCP/IP | 2.3.4.5 |

-continued

| Device Address | Port | Protocol | Logical Address |
|---|---|---|---|
| 1-4 | 1 | TCP/IP | 3.4.5.6 |
| 3-1 | 2 | TCP/IP | 4.5.6.7 |
| 4-1 | 2 | TCP/IP | 5.6.7.8 |

Device Address—A combination of the partition number that the application is executing within and the application's hardware address within the partition.

Protocol—The networking protocol that the application is using. Examples of networking protocols include TCP/IP, "NETBIOS," "IPX" (used in "Novell" networks) and Systems Network Architecture ("SNA").

Logical Address—A logical address for the application used by the particular networking protocol. For example, an address for a TCP/IP application may comprise 1.2.3.4. In the particular case of TCP/IP, a network mask field may also be included in the table. TCP/IP addressing and network masks will be apparent to one of ordinary skill in the art.

Port—The network port on the HNI that is to be used for communications with the application.

By way of example, the first table entry corresponds to an application executing in partition 1 and having an application hardware address within the partition of 2. The application will communicate through network port 1 using TCP/IP protocol and the logical address of the application is 1.2.3.4 (the network mask for this TCP/IP example is not shown). The second table entry corresponds to another application that is executing in partition 1 and communicating using TCP/IP through port 1, however having an application hardware address of 3 and a TCP/IP address of 2.3.4.5.

After initialization, operational sequences may begin. As one example of an operational sequence, inbound network traffic is processed (FIG. 6). Such processing begins with the receipt of a data frame from a network, through a port and into the HNI (105). A received data frame may have, for example, the following format and content as will be apparent to one of ordinary skill in the art:

| MAC | LLC | DATA |
|---|---|---|

MAC—Media Access Control—This field contains, for example, broadcast indications and other LAN specific information.

LLC—Logical Link Control—This field contains, for example, protocol information.

DATA—This field contains, for example, the transferred data at this protocol level.

Once the data frame has been received, the protocol of the frame is extracted from the LLC field thereof (107). As known in the art, the LLC field has the following format and sub-fields:

| DSAP | SSAP | CF |
|---|---|---|

DSAP—Destination Service Access Point—This field indicates the logical protocol of the data frame, for example, TCP/IP.

SSAP—Source Service Access Point—This field indicates the logical address of the source of the data frame.

CF—Control Field—This field includes miscellaneous control parameters.

The protocol of the received data frame is extracted from the DSAP field of the LLC.

The MAC field of the received data frame is then examined to determine if the received data frame comprises a broadcast (109). If so, a search of the connection table for each application that has the same protocol as that of the received (broadcast) data frame (121) is performed. After that, a copy of the frame is forwarded to each application having the same protocol (123). Transfer of the broadcast data frame to the destination applications is performed using the device addresses that can be found in the connection table associated with each application. The individual steps of performing such a transfer will be apparent to one of ordinary skill in the art.

If the received data frame is not a broadcast data frame, then further processing is performed. The logical destination address is extracted from the data field of the received data frame (111). The position and format of the logical destination address will be apparent to one of ordinary skill in the art based upon the previously determined protocol. The connection table is then searched for an application having the same logical address as the logical destination address of the received data frame (113). If the logical destination address is found as a logical address in the table (115) then the received data frame is passed to the application (117) corresponding to the found logical address. Otherwise, the data frame may be discarded or passed to a default application for processing (119).

In specific regard to the searching of table entries, only table entries corresponding to the port that the data frame was received through are searched (e.g., in step 113). This not only accelerates the search, but permits applications to have the same logical address on different networks (connected to different network ports). To explain, if multiple applications had the same logical address, a search of the table for a particular (e.g., destination) address might result in an ambiguous result comprising multiple applications. However, if the identically addressed applications are associated with different ports and the search is restricted to applications associated with only one port, such ambiguity is removed.

Figure 7:
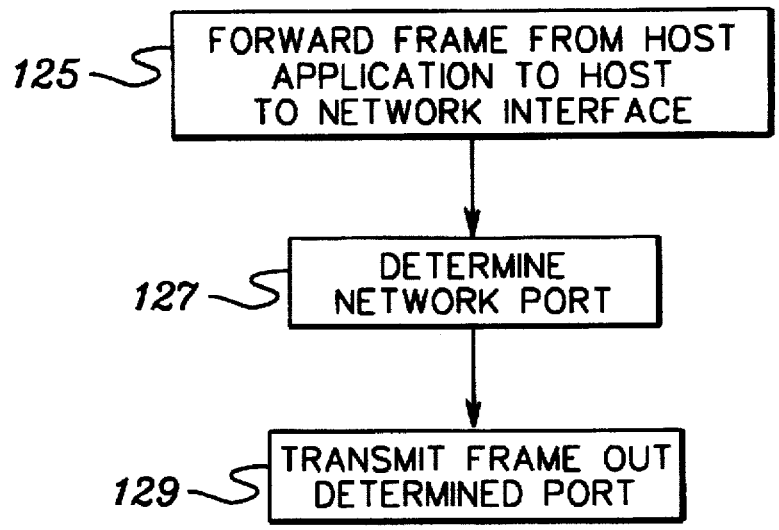
FIG. 7 is a flow diagram of an operational method for processing outbound network traffic according to one embodiment of the present invention.

The techniques of the present invention facilitate the processing of outbound network traffic (FIG. 7). An outbound data frame flows from an application in a partition to an HNI and out a port to a network. Advantageously, according to the techniques of the present invention, multiple applications in multiple partitions may communicate through a common network port on a common HNI.

Outbound traffic processing begins with the passing of an outbound data frame from an application in a partition to the HNI (125). The HNI extracts an outbound port parameter passed to it from the sending application (127) and the outbound data frame is passed through the port, transmitting the data frame (129).

In alternate embodiments of the present invention, the connection table may be restructured in many ways. As one example, the single connection table may be replaced with multiple connection tables. For example, a first table may comprise various protocol entries, with each protocol entry having a corresponding pointer to another table that contains the remainder of the "connection" table information. An example of the fields of a record within the above described first table is set forth below:

| Protocol | Pointer to Second Table |
| --- | --- |

The second table may have, for example the following fields:

| Device Address | Port | Protocol | Logical Address |
| --- | --- | --- | --- |

Additional fields in the second table could include, for example, the network mask (for TCP/IP protocol) and the type of network port, for example, Token Ring, Ethernet or FDDI.

Operationally, the two table embodiment functions similarly to the single table embodiment. For example, for inbound traffic processing, once the protocol is determined (e.g., FIG. 6, 107), the first table is searched for a protocol entry that corresponds to the received data frame's protocol. Once found, the second table pointed to by the pointer corresponding to the found protocol entry is used as the connection table for the inbound traffic processing techniques. In a broadcast situation, for example, the received data frame is sent to each application listed within the pointed to second table because all applications therein comprise the same protocol as the received data frame. During outbound traffic processing, a protocol for the outbound frame is determined from its LLC field and is looked up in the first table. The corresponding pointer field in the first table is used to identify a second table within which the device address of the application sending the outbound data frame is looked up. A port corresponding to the looked up device address is determined and the outbound data frame is transmitted therethrough.

The techniques of the present invention have many advantages and features associated with them. By facilitating network communications from multiple applications within multiple partitions through a common HNI, the resources required to perform such network communications have been reduced as compared to the conventional requirement of separate host to network interfaces for each communicating partition. Specifically, the hardware resources required have been reduced along with the associated software and license costs. Reduced hardware resources translate into a reduction in required channels, floor space, cabling, cooling, and power. In terms of software maintenance, a single configuration console corresponding to the single host to network interface may be used to manage all system network connections rather than multiple consoles for each separate, for example, IBM 3172, previously required. Further, migration to a system employing the techniques of the present invention may be performed without modifying current application programs. All these advantages and features translate into increased reliability, availability, and serviceability ("RAS") for the processing system.

While the invention has been described in detail herein in accordance with certain preferred embodiments thereof, many modifications and changes therein may be effected by those skilled in the art. Accordingly, it is intended by the following claims to cover all such modifications and changes as fall within the true spirit and scope of the invention.

What is claimed is:

1. A method of network communications implemented within a host network interface for use in a mainframe class data processing system having multiple partitions and a port to a network, said method comprising the steps of:
- (a) establishing a table defining communications paths between the port to the network and at least two partitions of the multiple partitions; and
- (b) passing data frames between the network and the at least two partitions of the multiple partitions, said passing data frames being through the port to the network and along the communications paths defined in the table established in said step (a) such that said network communications is effected.

2. The method of claim 1, wherein said port to said network comprises one of a Local Area Network ("LAN") port and a Wide Area Network ("WAN") port such that said passing step (b) comprises passing data frames between said one of said LAN port and said WAN port, and said at least two partitions.

3. The method of claim 2, wherein each partition of the at least two partitions has at least one application executing therein, and wherein said establishing step (a) further comprises defining within said table each application of the at least one application executing within each partition of the at least two partitions to have a logical application address associated with it, and wherein said passing step (b) further comprises extracting a logical destination address from a received data frame of said data frames, and if a logical application address corresponding to said logical destination address is in said table then passing said received data frame to a destination application of the applications defined within said table that has its logical application address corresponding to the logical destination address of the received data frame.

4. The method of claim 3, wherein said passing step (b) further comprises passing the received data frame to a default application executing in a partition of said at least two partitions if a logical application address corresponding to said logical destination address of said received data frame is not in said table.

5. The method of claim 3, wherein said establishing step (a) further comprises associating a device address with each application defined within said table, and wherein said passing step (b) further comprises passing said received data frame to said partition within which said destination application is executing along with a device address associated with the destination application in the table.

6. The method of claim 3, wherein said establishing step (a) further comprises associating a protocol with each application defined within said table, and wherein said passing step (b) further comprises checking said received data frame for a broadcast indication, and if said broadcast indication is found then extracting a broadcast frame protocol from said received data frame and passing said received data frame to each application defined in said table to have said broadcast frame protocol as its protocol.

7. The method of claim 2, wherein said establishing step (a) comprises establishing multiple tables, said multiple tables together defining said communications paths between the port to the network and the at least two partitions of the multiple partitions, said passing step (b) being performed according to said communications paths defined in said multiple tables.

8. A method of network communications implemented within a host network interface for use in a mainframe class data processing system having multiple partitions, a port to a network, and a table, each partition of at least two partitions of the multiple partitions having at least one application executing therein, said table containing an application definition associated with the port to the network for the at least one application executing within each partition of the at least two partitions, each application definition comprising a logical address, said method comprising the steps of:
- (a) receiving an inbound data frame from said network through said port to said network, said inbound data frame having a logical destination address;
- (b) extracting said logical destination address from said inbound data frame and looking up in said table a destination application of the at least one application executing within each partition of the at least two partitions having a corresponding logical address to said logical destination address; and
- (c) if said destination application having said corresponding logical address is found in said table, passing said inbound data frame to said destination application such that said network communications is effected between said network and said destination application.

9. The method of claim 8, wherein said mainframe class data processing system further comprises multiple ports to multiple networks, and wherein each application definition further comprises a port parameter such that said receiving step (a) comprises receiving said inbound data frame from a receiving port of said multiple ports, and said looking up step (b) comprises looking up said destination application in application definitions of said table having port parameters corresponding to said receiving port.

10. The method of claim 9, wherein said method further comprises transmitting an outbound data frame from a transmitting application of said at least one application executing within each partition of said at least two partitions, said transmitting comprising determining an outbound port of said multiple ports corresponding to said transmitting application within said table, and sending said outbound data frame out of said outbound port onto an attached network of said multiple networks.

11. The method of claim 8, wherein said extracting step (b) comprises extracting said logical destination address from a data field of said inbound data frame.

12. The method of claim 8, wherein each application definition further comprises a protocol, and wherein said method further comprises checking said inbound data frame for a broadcast indication and if a broadcast indication is present then said extracting step (b) further comprises extracting a broadcast protocol from a Destination Service Access Point ("DSAP") field of said inbound data frame and looking up all applications having a corresponding protocol in said table, and wherein said passing step (c) comprises passing said inbound data frame thereto.

13. The method of claim 8, wherein said mainframe class data processing system has multiple tables that together comprise said application definitions, a first table of said multiple tables comprising a protocol portion of said application definitions and including at least one protocol and an associated pointer to a secondary table of said multiple tables, said secondary table corresponding to said at least one protocol, said extracting step (b) further comprising extracting a received protocol from said inbound data frame, looking up said received protocol in said at least one protocol of said first table to obtain said associated pointer to a pointed to secondary table, and looking up said destination application in said pointed to secondary table.

14. A method of network communications implemented within a host network interface for use in a mainframe class data processing system having at least one partition having multiple applications executing therein, and a port to a network, said method comprising the steps of:

(a) establishing a table defining communications paths between the port to the network and at least two applications of the multiple applications; and (b) passing data frames between the network and the at least two applications of the multiple applications, said passing data frames being through the port to the network and along the communications paths defined in the table established in said step (a) such that said network communications is effected.

15. A system for network communications in a mainframe class data processing system having at least one partition having multiple applications executing therein, and a port to a network, said system comprising:

a table defining communications paths between at least two applications of the multiple applications and the port to the network;

means for passing data frames between the network and the at least two applications of the multiple applications, said data frames passing through the port to the network and along the communications paths defined in the table such that said network communications is effected; and wherein said table and said means for passing data frames are disposed within a host to network interface.

16. The system of claim 15, wherein said mainframe class processing system comprises at least two partitions, and wherein each application of the at least two applications executes within a different partition of the at least two partitions.

17. The system of claim 15, wherein said system comprises multiple ports to at least one network and wherein said communications paths defined in said table comprise communications paths between the at least two applications of the multiple applications and a first port of the multiple ports to a first network of the at least one network, and at least one communications path between an application of the multiple applications and a second port of the multiple ports to a second network of the at least one network.

18. The system of claim 15, wherein said port to the network comprises one of a Local Area Network ("LAN") port and a Wide Area Network ("WAN") port.

19. The system of claim 15 wherein said host to network interface is disposed external to said mainframe class data processing system and is connected thereto by a channel type attachment.

20. A host-to-network interface for a partitioned mainframe class data processing system having multiple partitions, comprising:

a network interface for coupling at least two partitions of the multiple partitions to a network;

a memory having a table established therein for defining communication paths between the network interface and at least two partitions of the multiple partitions.

21. The host-to-network interface of claim 20, wherein the table contains at least one device address associated with at least one of the at least two partitions for establishing a communication path thereto.

22. The host-to-network interface of claim 21, wherein the at least one device address is further associated with an application within the at least one partition, the communication path being established to said application within the at least one partition.

* * * * *